United States Patent [19]

Crocker

[11] E Re. 28,639

[45] Reissued Dec. 9, 1975

[54] AUTOMATIC DOOR OPERATOR

[75] Inventor: Thomas H. Crocker, Howard Township, Cass County, Mich.

[73] Assignee: Kawneer Company, Inc., Niles, Mich.

[22] Filed: Nov. 9, 1973

[21] Appl. No.: 414,358

Related U.S. Patent Documents

Reissue of:

[64] Patent No.: 3,619,946
Issued: Nov. 16, 1971
Appl. No.: 93,093
Filed: Nov. 27, 1970

[52] U.S. Cl. ..... 49/264; 49/137
[51] Int. Cl. ..... E05f 13/04
[58] Field of Search .....49/118, 123, 137, 141, 49/263-265, 327, 332, 360

[56] References Cited

UNITED STATES PATENTS

| | | | |
|---|---|---|---|
| 3,149,536 | 9/1964 | Hewitt | 91/464 X |
| 3,231,259 | 1/1966 | Bobrowski | 49/137 X |
| 3,269,060 | 8/1966 | Dimmitt et al. | 49/264 |
| 3,300,897 | 1/1967 | Wikkerink | 49/137 |
| 3,323,255 | 6/1967 | Sweetland, Sr. et al. | 49/137 X |
| 3,455,058 | 7/1969 | Hewitt | 49/360 X |

FOREIGN PATENTS OR APPLICATIONS

| | | | |
|---|---|---|---|
| 659,964 | 2/1929 | France | 49/118 |

*Primary Examiner*—Kenneth Downey
*Attorney, Agent, or Firm*—Mason, Kolehmainen, Rathburn & Wyss

[57] ABSTRACT

An automatic door operator for a door mounted upon a door frame for sliding movement in a vertical plane between open and closed positions includes a drive cylinder to open and close the door by means of a drive piston slidably movable within the drive cylinder between air inlets located at each end of the cylinder. In responsse to the movement or absence of traffic adjacent the door, a control valve supplies compressed air to one of the air inlets and exhaust the other air inlet so that the drive piston is moved toward the other air inlet, and the door is advanced toward its open or closed position. As the door nears either of its positions, a cushion assist switch is maintained in an operative condition for a short period of time, during which time the control valve reverses the air flow in the drive cylinder to assist in bringing the door to a gentle stop at its open or closed position.

9 Claims, 7 Drawing Figures

INVENTOR
THOMAS H. CROCKER
by
Mason, Kolehmainen, Rathburn and Wyss
ATTORNEYS.

INVENTOR
THOMAS H. CROCKER
by Mason, Kolehmainen, Rathburn and Wyss
ATTORNEYS

INVENTOR
THOMAS H. CROCKER by Mason, Kolehmainen, Rathburn and Wyss
ATTORNEYS

AUTOMATIC DOOR OPERATOR

Matter enclosed in heavy brackets appears in the original patent but forms no part of this reissue specification; matter printed in italics indicates the additions made by reissue.

This invention relates to automatic door operators, and more particularly, to a new and improved cushioning assist device for use with an automatic door operator that automatically opens and closes a door that is mounted upon a door frame for sliding movement in a vertical plane.

Commercially available automatic door operators are used to open and close a door which is mounted upon a door frame for sliding movement in a vertical plane between open and closed positions. One such type of automatic door operator is normally mounted in the transom bar of the door frame above the door and utilizes a drive piston which is connected to the door and which is slidably movable within a drive cylinder between air inlets located at each end of the cylinder. Upon the actuation of a suitable sensing device, such as a treadle mat or a photoelectric cell, by the movement of traffic adjacent the door, a control valve supplies compressed air to one of the air inlets and exhausts the other air inlet The resulting air flow within the drive cylinder causes the drive piston to move toward the other air inlet, and the door is slidably moved toward its open position. Similarly, in response to the absence of traffic near the door, the control valve supplies air to the drive cylinder in such a manner that the drive piston moves the door toward its closed position.

In these types of door operators, the amount of air supplied to the drive cylinder must be of sufficient magnitude to rapidly accelerate the drive piston toward the other end of the drive cylinder so that the door is opened or closed in a minimal amount of time. If it were not for the rapid opening of the door, the sensing device, such as the treadle mat, would have to be located at a substantial distance from the door to allow ample time for opening the door before the traffic which had activated the sensing device reaches the door. However, the rapid speed of the door while being opened or closed necessitates the use of some type of cushioning device to decelerate the door as the door reaches its fully open or closed position.

Commercially available cushioning devices are of the pneumatic type in which a pneumatic cylinder is provided into which is forced a spring biased piston as the door reaches its fully open or closed position. The resulting force applied to the door by the spring and the pneumatic pressure formed within the cylinder decelerates the door in the required distance, but normally causes some type of oscillation of the door after the door reaches its fully open or closed position so that the door is not brought to a gentle stop.

Accordingly, one object of the present invention is to provide a new and improved automatic door operator for sliding doors.

Another object is to provide a new and improved cushioning assist device for automatic door operators used with sliding doors.

In accordance with these and many other objects, an embodiment of the present invention comprises an automatic door operator to open and close a sliding door which is connected to a drive piston slidably movable within a drive cylinder and which is mounted upon door frame for sliding movement in a vertical plane be tween open and closed positions. Upon the actuation c a suitable sensing device, such as a treadle mat, by th movement of traffic adjacent the door, a control valv supplies compressed air to a first air inlet located at on end of the drive cylinder and exhausts a second air inl which is located near the other end of the cylinder. Th force of the compressed air in the cylinder causes th drive piston to move toward the second air inlet, an the door is moved toward its open position. As the doc nears its open position, an opening cushion assi switch is maintained in an operative condition for short period of time, during which time the contr valve supplies the compressed air to the second air inl and exhausts the first air inlet. The diversion of air flo in the drive cylinder assists a first pneumatic cushionin device to rapidly decrease the speed of the drive pisto and the door so that the door is brought to a gentle sto at its open position.

After the traffic adjacent the door has been abser for a specified period of time, the control valve supplie compressed air to the second air inlet and exhausts th first air inlet to the atmosphere. The resulting move ment of the drive piston toward the first air inlet cause the door to move toward its closed position. As th door nears its closed position, a closing cushion assi switch is activated which again causes the control valv to reverse the air flow to the first air inlet and exhaus the second air inlet to the atmosphere for a short perio of time. The reversal of air flow in the drive cylinder a sists a second pneumatic cushioning device to gentl stop the door at its closed position.

Many other objects and advantages of the present ir vention will become apparent from considering the fo lowing detailed description in conjunction with th drawings in which:

FIG. 6 is a partially schematic diagram of the electr cal and pneumatic circuits of an automatic door opera tor embodying the present invention.

Figure 2:
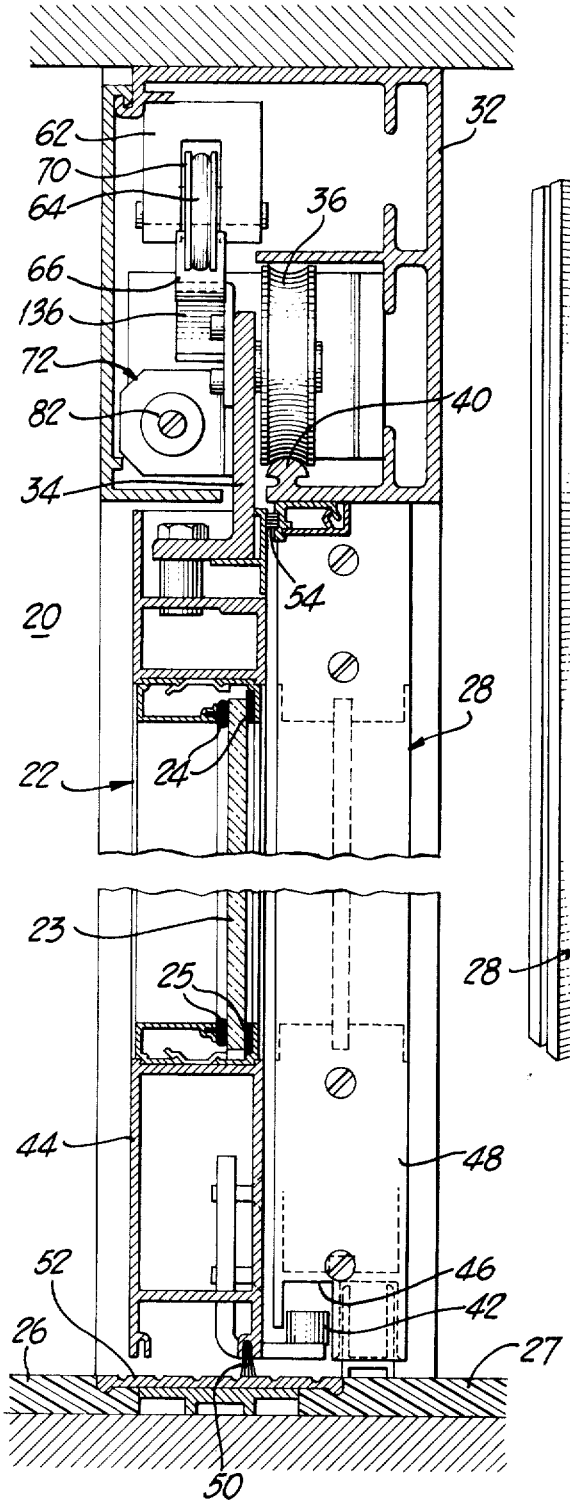
FIG. 2 is a cross sectional, fragmentary view of th door frame taken along line 2—2 in FIG. 1.
Figure 1:
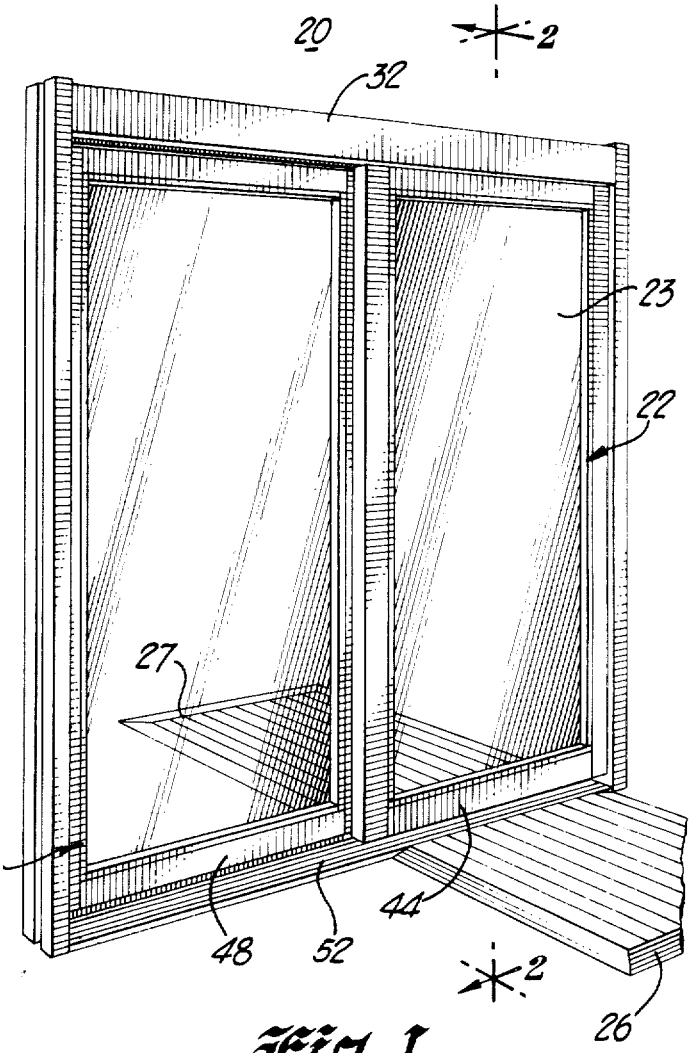
FIG. 1 is a perspective view of a door frame or er trance embodying the present invention.

Referring now more specifically to FIGS. 1–5 of th drawings, therein is illustrated a door frame or entranc which is indicated generally as 20 and which embodi the present invention. The door frame 20 includes door 22 which has a glass panel 23 secured by gla stops 24 and 25 and which is mounted upon the doc frame 20 for sliding movement in a vertical plane be tween open and closed positions. Upon actuation of suitable sensing device, such as treadle mat 26 or 27 b traffic adjacent the door 22, the door 22 is moved to i open position in front of a sidelite 28 by an automat door operator 30 that is substantially located in a overhead transom bar 32 which forms a part of th door frame 20. In absence of actuation of either of th treadle mats 26 or 27 for a specified period of time, th door operator 30 returns the door 22 to its normally closed position as shown in FIG. 1.

The door 22 is slidably mounted on the door frame 20 by a door carriage 34 having a pair of wheels 36 and 38 to allow the movement of the door 22 along a track 40 located in the overhead transom bar 32. In order to maintain the door 22 in a stable vertical plane as it is being opened or closed by the door operator 30, a guide wheel 42 is attached to a base section 44 of the door 22 and rides within a recess 46 in a base section 48 of the sidelite 28.

If the door entrance or frame 20 is used as an outside entrance into and out of a building rather than an entrance in an internal portion of the building, a weather strip 50 is connectable to the base section 44 of the door 22 and makes sealing contact with a threshold 52 over which the door 22 is located. In addition, a weather strip 54 is connectable to the overhead transom bar 32 to insure the proper sealing of the door frame 20 along its top portion.

Figure 3:
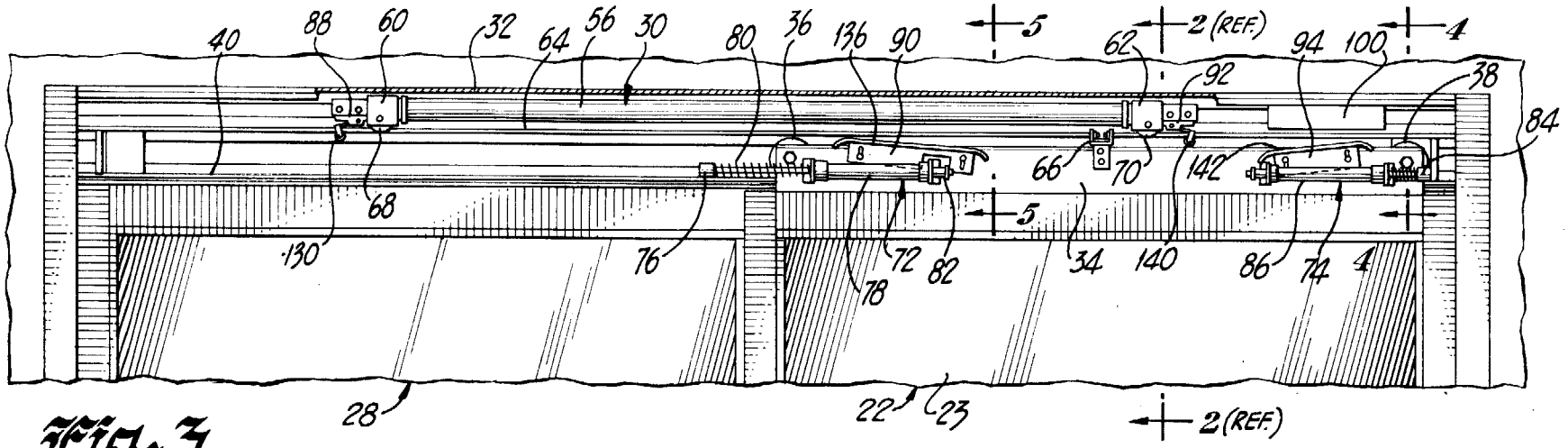
FIG. 3 is a plane view of the top portion of the doc frame shown in FIG. 1 with the front portion of th door frame removed.
Figure 4:
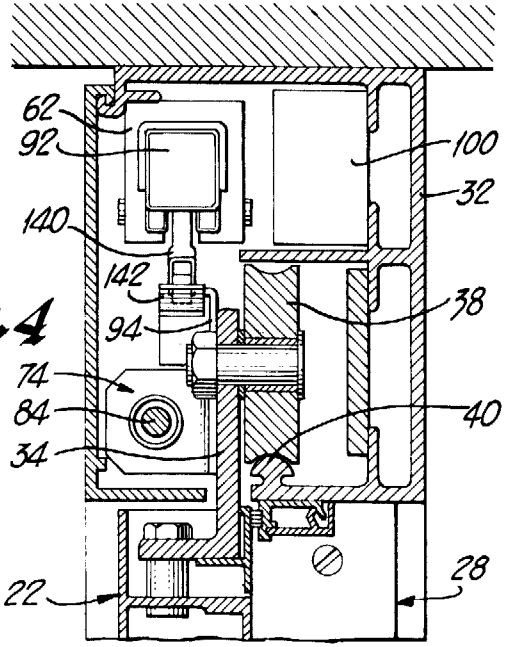
FIG. 4 is a cross sectional view of the door fram taken along line 4—4 in FIG. 3.

The door operator 30, as can be best seen in FIG. 3 of the drawings, includes a drive cylinder 56 which is located in the overhead transom bar 32 and which has air inlets 60 and 62 at either end. A drive cable 64 extends through and along the length of the drive cylinder 56 and is connected to the door carriage 34 by a drive yoke 66. The drive cable 64 is guided for movement in and around the drive cylinder 56 by a pair of guide rollers 68 and 70 which are located adjacent the air inlets 60 and 62, respectively. By simply connecting an auxiliary or slave cable to the yoke 66, the door operator 30 can be used to open bi-parting sliding doors as well as the illustrated door 22.

Without the utilization of cushioning devices, the door 22 would impact against the door frame 20 upon opening and closing. To provide some type of cushioning for the opening and closing the door 22, pneumatic cushioning devices 72 and 74 are mounted at either end of the door carriage 34. As the door 22 approaches its open position, the cushioning device 72 decelerates the door 22 by applying a force against the door carriage 34. The force applied is the result of driving a piston 76 into a cylinder 78 against the force of a spring 80 and the pneumatic pressure that is built up within the cylinder 78 as the piston 76 is inserted further into the cylinder 78. By adjusting an exhaust control screw 82 on the cylinder 78, the amount of force or cushioning supplied to the door 22 by the cushioning device 72 can be varied. Likewise, as the door 22 is being closed by the door operator 30, the cushioning device 74 provides a certain amount of cushioning to the door 22 by the forcing of a spring biased piston 84 into a pneumatic cylinder 86.

The cushioning devices 72 and 74 are not capable by themselves of properly cushioning the opening and closing of the door 22, for the speed attained by the door 22 as it is opened or closed must be of sufficient magnitude to open or close the door 22 in a minimal amount of time. If it were not for the rapid opening of the door 22, the treadle mats 26 and 27 would have to be located at a substantial distance from the door 22 to allow ample time for the opening of the door 22 before the traffic which had activated the treadle mat 26 or 27 reaches the door 22.

In order to assist the cushioning device 82 in gently stopping the door at its open position, a normally open cushion switch 88 is activated by an opening cushion assist cam 90 located on the door carriage 34. The activation of the switch 88, as will be hereinafter more fully explained, enables the necessary cushioning assist to be applied to the door 22 as it is opened by the door operator 30. Similarly, as the door 22 is being closed by the door operator 30, a normally closed cushioning assist switch 92 is operated by a closing cushion assist cam 94 that is located near the cushioning device 74 on the door carriage 34. The operation of the switch 92 enables the door 22 to be brought to a gentle stop at its closed position.

Figure 5:
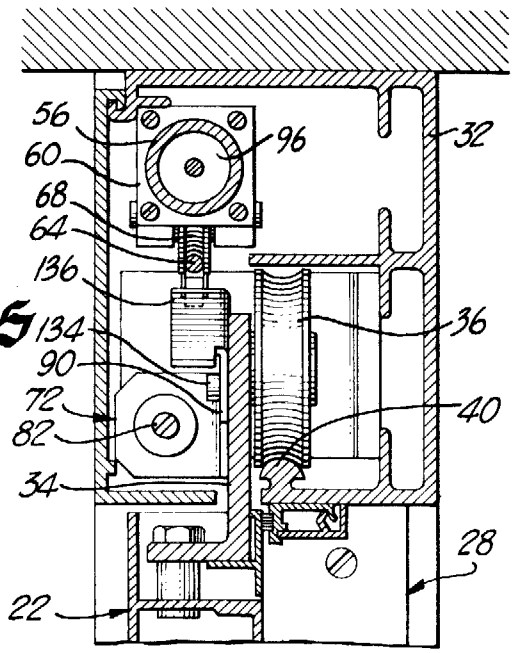
FIG. 5 is a cross sectional view of the door fram taken along line 5—5 in FIG. 3.
Figures 5, 7:
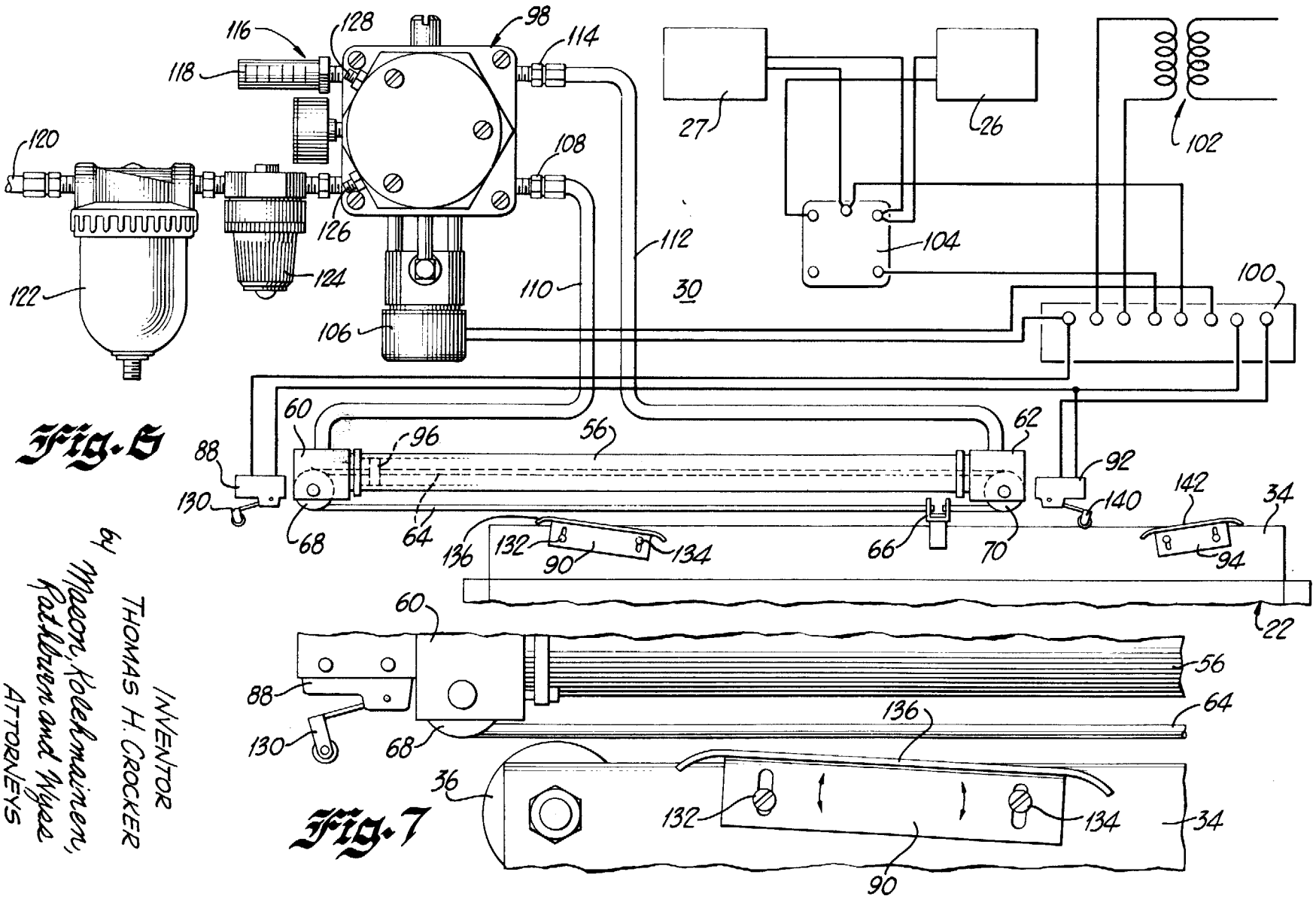
FIG. 7 is an enlarged plane view of a portion of th automatic door operator shown in FIG. 6.

The actual operation of the automatic door operator 30 can be more fully explained by reference to FIGS. 6 and 7 of the drawings. As is shown in FIG. 6, the door 22 is held in its normally closed position by maintaining near the air inlet 60 a drive piston 96 to which is connected the drive cable 64 and which is slidably movable within the drive cylinder 56. Upon activation of either of the treadle mats 26 or 27, a control valve 98 supplies compressed air to the drive cylinder 56 in such a manner that the drive piston 96 is moved towards the air inlet 62. As the piston 96 advances toward the air inlet 62, the drive cable 64 is moved about the guide rollers 68 and 70 causing the movement of the door 22 toward its open position. After a specified period of time has elapsed in which neither of the treadle mats 26 or 27 has been actuated, the control valve 98 supplies compressed air to the drive cylinder 56 in such a manner that the drive piston 96 moves toward the air inlet 60, and the door 22 is returned to its closed position by the movement of the drive cable 64 about the guide rollers 68 and 70.

More specifically, the operation of the door operator 30 is controlled by a time-delay master relay unit 100. The master unit 100 is mounted adjacent the drive cylinder 56 in the overhead transom bar 32 and is coupled to an appropriate power supply through a transformer 102. Upon actuation of either of the treadle mats 26 or 27 by the movement of traffic adjacent the door 22, a signal may be transmitted through a key switch 104 to the master unit 100. However, the key switch 104 may be turned off to prevent signals from being transmitted from the treadle mats 26 and 27 to the master unit 100 so that the door 22 is essentially locked in its closed position. On the other hand, the key switch 104 may be set to a hold open position, in which case a signal is continuously transmitted to the master unit 100 and the door 22 is maintained in its open position. Alternately, the key switch 104 may be so set that only one of the treadle mats, such as mat 26 is capable of transmitting a signal to the master unit 100 to open the door 22.

In response to a signal actually being transmitted through the key switch 104 to the master unit 100, a continuous actuating signal or potential is transmitted by the master unit 100 to a controller 106 on the control valve 98. The control valve 98 supplies compressed air through a port 108 and an air line 110 to the air inlet 60 on the drive cylinder 56. At the same time, the control valve 98 exhausts the air inlet 62 to the atmosphere by connecting the air inlet 62 through an air line 112 and a port 114 to an exhaust assembly 116 having a muffler 118.

The control valve 98 receives compressed air from an appropriate air supply line 120 which is connected to the control valve 98 by means of an air filter 122 and a pressure regulator 124. The air filter 122 purifies the air supplied to the control valve 98 from the line 120 so that impurities in the air do not hinder the operation of the door operator 30. By adjusting the pressure regulator 124 and an opening speed control 126 in the control valve 96, the amount of air supplied to the air inlet 60 can be controlled, and the speed at which the door 22 is opened may be readily adjusted. Likewise, an adjustment of a closing speed control 128 on the control valve 96 enables the variance of the speed of the door 22 as it is being closed by the door operator 30.

The compressed air actually supplied by the control valve 98 to the air inlet 60 in response to the actuating signal transmitted by the master unit 100 forces the piston 96 toward the air inlet 62. The drive cable 64 is pulled about the guide rollers 68 and 70 so that the door carriage 34 is pulled by the drive yoke 66 toward the left, as viewed in FIG. 6. The movement of the door carriage 34 advances the door 22 toward its open position in front of the sidelite 28.

As the door 22 nears its open position, the opening cushion assist cam 90 on the door carriage 34 makes contact with a roller lever 130, and the normally open switch 88 is closed. The closing of the switch 88 causes the master unit 100 to discontinue transmitting the actuating signal to the controller 106 on the control valve 98. In absence of the actuating signal, the control valve 98 supplies compressed air through the port 114 and the air line 112 to the air inlet 62 and exhausts the air inlet 60 to the atmosphere through the air line 110 and the port 108.

The reversal of air flow within the drive cylinder 56 in response to the closing of the switch 130 causes the drive piston 96 to be rapidly decelerated. As the speed of the drive piston 96 is decreased, the speed of the door 22 as it nears its open position is also decreased which enables the opening cushioning device 72 to bring the door 22 to a gentle stop at its open position in front of the sidelite 28. Without the assistance of the reversal of the air flow within the drive cylinder 56, the opening cushion device 72 could not bring the door 22 to such a gentle stop at its open position.

As long as the opening cushion assist cam 90 maintains the switch 88 closed, the control valve 98 supplies the air to the air inlet 62 and exhausts the air inlet 60 to the atmosphere. By varying the length of time that the switch 88 is closed, the amount of deceleration of the door 22 caused by the reversal of air flow in the drive cylinder 56 may be adjusted. To allow for such adjustment, the cam 90 is pivotally mounted on the door carriage 34 by a pair of screws 132 and 134. As is evident from FIG. 7 of the drawings, the rotating of the cam 90 about the screws 132 and 134 not only allows the adjustment of the point in time during the opening of the door 22 at which the cam surface 136 contacts the roller lever 130, but also the length of time during which the surface 136, is maintained in contact with the roller lever 130. With this adjustment to the closing of the switch 88 and the adjustment to the cushioning device 72, the appropriate amount of cushioning of the door 22 as it reaches its open position is provided.

As soon as the cam surface 136 no longer is making contact with the roller lever 130, the switch 88 is allowed to open and the master unit 100 again transmits an actuating signal to the control valve 98. Compressed air is supplied to the air inlet 60, and the air inlet 62 is exhausted to the atmosphere so that the control valve 98 maintains the drive piston 96 at a position adjacent the air inlet 62, and the door 22 is maintained at its open position.

Once a sufficient time has elapsed in which the master unit 100 has received no signals from either of the mats 26 or 27, the master unit 100 again discontinu transmitting the actuating signal to the controller 10 on the control valve 98. The control valve 98 suppli compressed air through the port 114, and the air lir 112 to the air inlet 62 on the drive cylinder 56 and e hausts the air inlet 60 through the air line 110 and tl port 108 to the exhaust assembly 116. The flow of a within the drive cylinder 56 causes the drive piston 9 to move toward the air inlet 60 which forces the dri cable 64 about the guide rollers 68 and 70 so that tl door carriage 34 is moved toward the right, as viewe in FIG. 6, and the door 22 is advanced toward its close position.

As the door 22 nears its closed position, the cam 9 makes contact with a roller lever 140 which opens tl normally closed switch 92. In response to the openir of the switch 92, the master unit 100 again transmits a actuating signal to the controller 106. The contr valve 98 again supplies air through the port 108 and tl air line 110 to the air inlet 60 and exhausts air inlet 6 through the air line 112 and the port 114 to the exhau assembly 116. As was the case during the opening the door 22, the reversal of the air flow within the dri cylinder 56 causes the deceleration of the drive pistc 96 and thereby rapidly decreases the speed of the do 22 as it nears its closed position.

The cam 94 is pivotally mounted on the door carria 34 so that the amount of time during which a cam su face 142 on the cam 94 is making contact with the ro ler lever 140 and the switch 92 is maintained opene readily can be adjusted. As long as the switch 92 opened, the control valve 98 maintains the reversal the air flow in the drive cylinder 56 and provides tl necessary cushion assist for the cushioning device 74 bring the door 22 to a gentle stop at its closed positio Once the switch 92 is allowed to close by the relea of the roller lever 140 from the cam 94, the master un 100 discontinues the transmission of the actuating si nal to the controller 106. The control valve 98 aga supplies air to the air inlet 62 and exhausts the air inl 60 to the atmosphere so that the drive piston 96 maintained at a position adjacent the air inlet 60 ar the door 22 remains in its closed position until the act ation of either of the treadle mats 26 or 27.

Although the present invention has been describe by reference to only a single embodiment thereof, will be apparent that numerous other modifications ar embodiments may be devised by those skilled in the a and it is intended by the appended claims to cover modifications and embodiments which will fall with the true spirit and scope of the present invention.

What is claimed as new and desired to be secured Letters Patent of the United States is:

1. An automatic door operator used in opening ar closing a door which is mounted upon a door frame f sliding movement in a vertical plane between open ar closed positions in response to movement of traffic a jacent the door, said door operator comprising:

a drive cylinder mounted in said door frame and ha ing first and second air inlets;

a piston slidably movable within said drive cylind between said first and second air inlets;

*a cable* drive means *extending through said cylind and secured to said piston for* connecting said pist to said door;

a controlled source of compressed air connected said first and second air inlets and operable to su ply the compressed air to either of said first a second air inlets;

a control means coupled to said controlled source of compressed air and rendering said controlled source effective to supply compressed air to said first air inlet to move said piston toward said second air inlet in response to said traffic; and cushioning assist means coupled to said control means and operable to render said controlled source effective to supply said air to said second air inlet to retard the movement of said drive piston for a short period of time.

[ 2. The door operator as set forth in claim 1 wherein said drive means is a cable connected to said door by a drive yoke.]

3. The door operator as set forth in claim 1 wherein said drive cylinder is mounted in an overhead transom bar that forms a part of said door frame.

4. The door operator as set forth in claim 1 wherein said control means renders said source of air effective to supply compressed air to said second air inlet to move the piston toward said first air inlet in the absence of traffic adjacent the door, and said cushioning assist means rendering said controlled source effective to supply said air to said first air inlet to retard the movement of said piston for a short period of time.

5. The automatic door operator as set forth in claim 1 wherein said door is moved toward its open position as said piston is moved toward said second air inlet.

6. The door operator as set forth in claim 1 including pneumatic cushioning devices connectable to said door, said pneumatic cushioning devices stopping said door in its open or closed position.

7. An automatic door operator used in opening and closing a door which is mounted upon a door frame for sliding movement in a vertical plane between open and closed positions in response to movement of traffic adjacent the door, said door operator comprising:

a drive cylinder mounted in said door and having first and second air inlets at either end;

a drive piston slidably movable within said drive cylinder between said first and second air inlets;

a drive cable *extending through said cylinder and secured to said drive piston for* connecting said drive piston to said door;

a source of compressed air;

a control valve coupling said source to each of said first and second air inlets;

a sensing device actuable by said traffic;

a control means coupled to said sensing device and said control valve and controlling said control valve to supply the air to said first air inlet upon actuation of said sensing device to move said drive piston toward said second air inlet; and cushioning assist means controlled by the movement of said door, said cushioning assist means enabling said control valve to supply the air to said second air inlet as said drive piston nears said second air inlet.

8. The door operator as set forth in claim 7 wherein said control means enables said control valve to supply the air to said second air inlet whenever said sensing device is not actuated for a predetermined time in order to move said drive piston toward said first air inlet, and said cushioning assist means enables said control valve to supply said air to said first air inlet as said drive piston nears said first air inlet.

9. An automatic door operator used in opening and closing a door which is mounted upon a door frame for sliding movement in a vertical plane between open and closed positions in response to movement of traffic adjacent the door, said door operator comprising:

a drive cylinder;

a drive piston slidably movable in said drive cylinder;

*flexible* connecting means *extending into said cylinder and secured to said piston for* connecting said piston to said door;

a control means actuable by said traffic;

a source of compressed air controlled by said control means and connected to said drive cylinder, said source supplying compressed air to said drive cylinder upon actuation of said control means to move said drive piston and open said door; and a cushioning assist means coupled to said control means and controlled by said door to assist in bringing said door to a gentle stop at said open position by reversing the supply of air to said drive cylinder.

10. The door operator as set forth in claim 9 including a pneumatic cushioning means connected to said door to aid said cushioning assist means to bring said door to a gentle stop at its open position.

* * * * *